(12) United States Patent
Beutler et al.

(10) Patent No.: US 10,901,411 B2
(45) Date of Patent: Jan. 26, 2021

(54) METHOD FOR OPERATING A TRANSPORT SYSTEM HAVING AT LEAST ONE TRANSPORT MEANS AND CORRESPONDING TRANSPORT SYSTEM

(71) Applicant: AUDI AG, Ingolstadt (DE)

(72) Inventors: Stephan Beutler, Ingolstadt (DE); Maximilian Ertl, Kipfenberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/244,508

(22) Filed: Jan. 10, 2019

(65) Prior Publication Data

US 2019/0243354 A1 Aug. 8, 2019

(30) Foreign Application Priority Data

Feb. 5, 2018 (DE) .................. 10 2018 201 687

(51) Int. Cl.
| | | |
|---|---|---|
| B60S 11/00 | (2006.01) | |
| G05D 1/00 | (2006.01) | |
| G06Q 50/30 | (2012.01) | |
| G05D 1/02 | (2020.01) | |
| G06Q 20/14 | (2012.01) | |

(52) U.S. Cl.
CPC ............ *G05D 1/0022* (2013.01); *B60S 11/00* (2013.01); *G05D 1/0088* (2013.01); *G05D 1/0272* (2013.01); *G06Q 20/145* (2013.01); *G06Q 50/30* (2013.01)

(58) Field of Classification Search
CPC ............ G06Q 30/0283; G06Q 20/145; B60W 2530/10
See application file for complete search history.

(56) References Cited

U.S. PATENT DOCUMENTS

| | | | |
|---|---|---|---|
| 2013/0246207 A1* | 9/2013 | Novak | ............... G06Q 30/0283 |
| | | | 705/26.2 |
| 2016/0334797 A1 | 11/2016 | Ross et al. | |
| 2017/0147959 A1* | 5/2017 | Sweeney | ............. G05D 1/0022 |

(Continued)

FOREIGN PATENT DOCUMENTS

| | | |
|---|---|---|
| DE | 102008008307 A1 | 4/2009 |
| DE | 102012202781 A1 | 8/2013 |

(Continued)

OTHER PUBLICATIONS

Examination Report dated Oct. 30, 2018 of corresponding German application No. 102018201687.9; 13 pages.

(Continued)

*Primary Examiner* — Kenneth J Malkowski
(74) *Attorney, Agent, or Firm* — Maier & Maier, PLLC

(57) ABSTRACT

A method for operating a transport system having at least one transport means. In this case, it is provided that a period of use of the transport by a user or at least a beginning of the period of use is recorded by detecting a use of the transport means if at least two of the following conditions are met: A communication link of an assistance device of the user to the transport system exists or is being created; a load capacity of the transport means or a change in the load capacity is detected; and a movement of the transport means and/or an operation of a drive device of the transport means exists or exist or is or are being initiated.

11 Claims, 1 Drawing Sheet

(56) References Cited

U.S. PATENT DOCUMENTS

2017/0213165 A1* 7/2017 Stauffer .................. G06Q 10/02
2017/0284819 A1   10/2017 Donnelly
2017/0327091 A1* 11/2017 Capizzo ................. B60L 53/14
2018/0033310 A1    2/2018 Kentley-Klay et al.

FOREIGN PATENT DOCUMENTS

| DE | 102012221288 A1 | 5/2014 |
| DE | 102017101494 A1 | 7/2017 |
| DE | 102017101499 A1 | 7/2017 |
| WO | 2017/087984 A1  | 5/2017 |

OTHER PUBLICATIONS

Search Report dated Feb. 22, 2019 in corresponding European Application No. 18211628.5; 12 pages including partial machine-generated English-language translation.
Search Report dated Jun. 25, 2020 in corresponding European Application No. 18 211 628.5; 9 pages including partial machine-generated English-language translation.

* cited by examiner

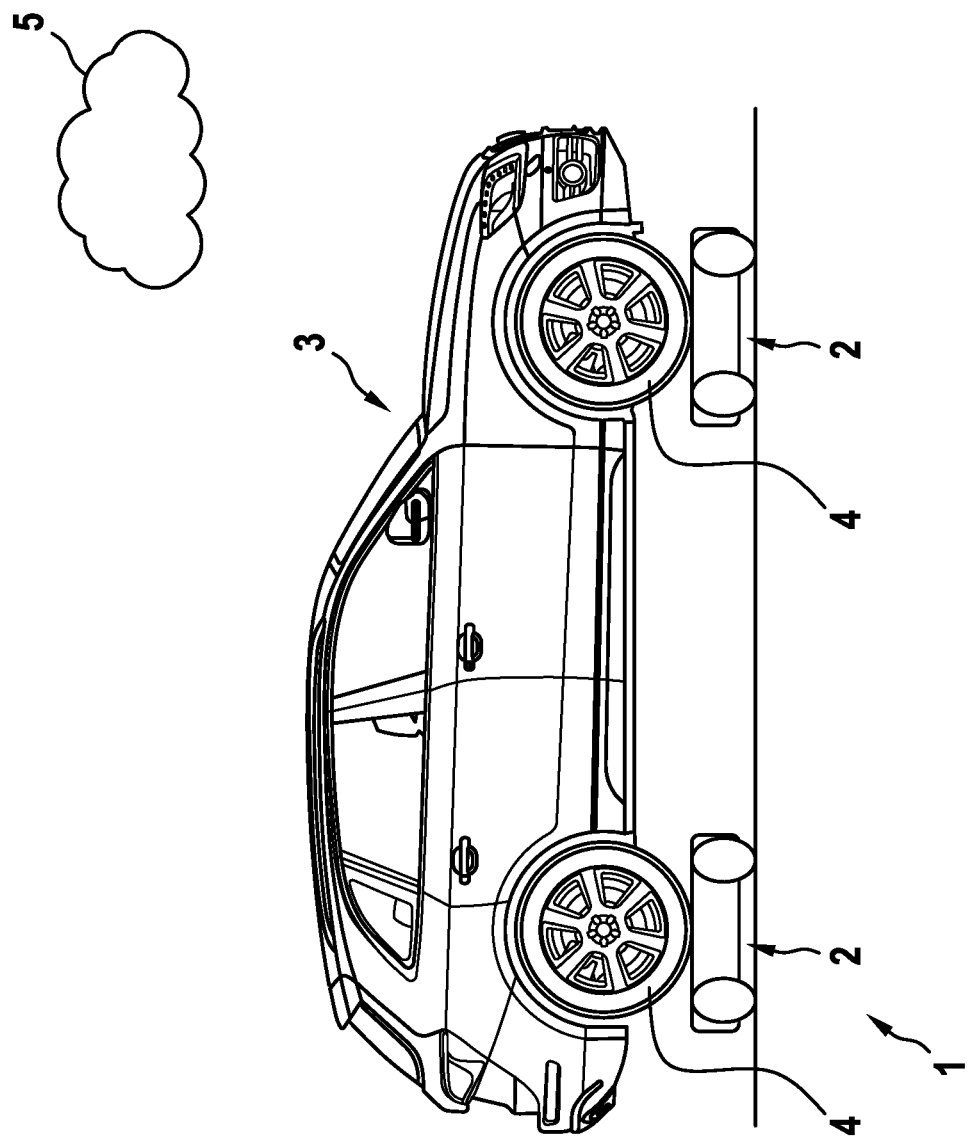

METHOD FOR OPERATING A TRANSPORT SYSTEM HAVING AT LEAST ONE TRANSPORT MEANS AND CORRESPONDING TRANSPORT SYSTEM

FIELD

The invention relates to a method for operating a transport system having at least one transport means as well as to a corresponding transport system.

BACKGROUND

Known from the prior art is, for example, the publication DE 10 2008 008 307 B3. It describes an apparatus for activating and deactivating an access control device that is designed for receiving an electronic opening and locking code transmitted by a mobile communication terminal unit. In this case, the apparatus is to comprise an NFC circuit, which is formed from a transponder IC and a transceiver IC, as well as an oscillating circuit comprising a solenoid and a capacitor, wherein the transponder IC and the transceiver IC can be alternately connected to the oscillating circuit via a switch and the transponder IC is connected to the switch via a semiconductor switch.

SUMMARY

It is the object of the invention to propose a method for operating a transport system that has advantages in comparison to known methods, in particular, a flexible utilization of the at least one transport means as well as a reliable billing with respect to a user of the transport means.

In this case, it is provided that a period of use of the transport means by a user or at least a beginning of the period of use is recorded by detecting a use of the transport means if at least two of the following conditions are met: A communication link of an assistance device of the user to the transport system exists or is being created; a load capacity of the transport means or a change in the load capacity is detected; and a movement of the transport means and/or an operation of a drive device of the transport means is or are present or being initiated.

The transport system comprises the at least one transport means, that is, for example, exactly one transport means, but preferably a large number of transport means. In the scope of this description, insofar as the at least one transport means or the transport means is addressed, the statements can always be extended to the large number of transport means or the plurality of transport means. The transport system makes available the transport means to the user at least temporarily, preferably solely temporarily, or permanently. However, the transport means is always assigned to the transport system and is not the property of the user.

For example, for purposes of billing, therefore, the period of use of the transport means by the user needs to be recorded. This should be done as reliably and flexibly as possible, in particular, in order to ensure a reliable and transparent billing to the user. For this purpose, there is recourse to three conditions, at least two of which need to be met in order to detect the use of the transport means, and consequently, the existence of the period of use or at least the beginning of the period of use.

A first condition requires that the communication link of the assistance device of the user to the transport system currently exists or at least is being created. The assistance device is understood to mean, for example, a mobile device, in particular, a personalized mobile device, which is assigned or can be assigned to the user. In this regard, the user can be identified by way of the assistance device, at least for purposes of billing. Especially preferred, the assistance device makes possible a clear identification of the user.

The communication link between the assistance device and the transport system, in particular the transport means, can be initiated on the part of the assistance device or on the part of the transport system. This is understood to mean that the creation of the communication link is initiated either by the assistance device or by the transport system. The communication link is provided and designed for the transmission of data. The communication link exists, in particular, as a wireless communication link. Obviously, it is also possible alternatively to create a wired communication link, in which the assistance device is to be connected or is connected via a cable to the transport system, in particular to the transport means.

In the context of a second condition, the load capacity of the transport means or the existence of the load capacity or at least the change in the load capacity is checked. If the existence of the load capacity or at least the change in the load capacity is detected, then—provided that at least one of the other conditions is also met—the use of the transport means and consequently the existence of the period of use or the beginning of the period of use is detected.

For example, it is established that the period of use exists as long as the load capacity of the transport means is indicated and at least one of the other conditions is met. In contrast, only the beginning of the period of use is recorded when the change in the load capacity is detected and one of the other conditions is met. In other words, the period of use exists as long as the load capacity of the transport means is indicated, and, in addition, one of the other conditions is met. The beginning of the period of use, in contrast, coincides with the point in time at which the change in the load capacity occurs and one of the other conditions is met.

A third condition checks the movement of the transport means or the operation of the drive device. Here, too, it can be provided that the period of use exists as long as the movement of the transport means or the operation of the drive device is indicated and one of the other conditions is met. The beginning of the period of use, in contrast, coincides with the point in time at which the movement of the transport means begins or the operation of the drive device is initiated and one of the other conditions is met.

The requirement that at least two of the mentioned conditions need to be met in order that the use of the transport means or the existence of the period of use or at least the beginning of the period of use is detected makes possible an especially reliable detection, and consequently, a transparent billing to the user. Obviously, it can also be provided that all of the conditions need to be met in order that the use of the transport means is detected.

Especially preferred, it is provided that the condition that the communication link of the assistance device to the transport system needs to exist or needs to be created is a necessary condition, and consequently, always needs to be met in order to detect the existence or the beginning of the period of use. In order that the use of the transport means is detected, it is necessary to meet, besides this condition, at least one of the other two conditions.

The transport system serves fundamentally for the transport of a load. Said load can be of any kind and can be governed by the requirements placed on the transport system. For example, the load exists in the form of transported goods and/or of at least one living being, the latter of which is understood to mean at least one person, in particular the user, and/or at least one animal. If the transport system serves for the transportation of transported goods for a fee, then the transported goods can also be referred to as freight. The transported goods themselves or the freight can likewise exist in any form, such as, for example, as container cargo, liquid cargo, grabbable cargo, bulk cargo, suction cargo, bulk material, or piece goods.

The transport system or the transport means is adapted to or at least can be adapted to the load or the transported goods. In the case of container cargo, this means, for example, that the transport means is provided or formed for the transportation of a container that receives the container cargo. If the load exists in the form of the at least one living being, then the transport system or the transport means has, for example, a corresponding transport compartment or can be supplemented by such a transport compartment. The transport compartment is present, for example, in the form of a passenger compartment. Alternatively to the preferably closed transport compartment, it is also obviously possible to provide an open transportation space, that is, for example, a place to sit. In the latter case, a seat is preferably assigned to the transport means or can be connected to it.

The transport system preferably has a plurality of transport means. Said transport means can be fundamentally different from one another or they can be at least partially or overall identical in construction. Especially preferred, each of the transport means can move independently of each of the other transport means. In particular, this means that each of the transport means is driven in a fully autonomous manner, that is, drives to or can drive to a transport starting location and/or transport destination, which are or is assigned to it, in an autonomous or automatic manner, for example. To this end, the transport means or the plurality of transport means is or are correspondingly designed, and therefore, has or have, for example, means for carrying out an autonomous or independent drive operation. These means may comprise, in particular, a navigation device, a route locating device, an environment monitoring device, or the equivalent.

The transport means are preferably emission-free and hence produce no or nearly no exhaust during their operation. This is ensured, for example, through a purely electric operation of the transport means. Preferably, in this regard, each of the transport means is equipped with an electric machine to drive it as well as with a corresponding energy storage unit for the energy required to operate the drive. Additional requirements placed on the transport means or the plurality of transport means may ensue from the safety regulations at the site of operation that are to be observed under certain circumstances, in particular, if the transport means are to be operated in public areas, preferably on public roads.

Another embodiment of the invention provides that an end of the period of use is detected if at least one of the following conditions is met: The communication link of the assistance device of the user to the transport system is terminated or is being terminated; the load capacity no longer exists or a change in the load capacity is detected; and a movement of the transport means and/or an operation of the drive device of the transport means is or are suspended or is being suspended.

The period of use extends from its beginning up to its end. Whereas, for the detection of the beginning of the period of use, preferably at least two conditions need to be met, it may be sufficient, for the detection of the end of the period of use, for only at least one of the conditions to be met. Preferably, it is obviously provided that, for the detection of the end of the period of use, at least two conditions or all of the conditions also need to be met.

In the context of a first condition for the detection of the end of the period of use, it is checked whether the communication link of the assistance device to the transport system is terminated or is being terminated. This requires that the communication link existed previously and is now either already terminated is or is just being terminated. In the context of a second condition, the load capacity is checked. If said load capacity no longer exists, that is, it is absent or is becoming absent or is changing, then the condition is met. The change in the load capacity is understood to mean, in particular, a reduction in the load capacity.

A third condition requires the suspension of the movement of the transport means or of the operation of the drive device and in this regard, a stopping of the transport means. For example, the condition is met if the transport means is at a standstill or if the drive device is deactivated, that is, if no torque directed at driving the transport means is supplied.

Overall, there are different possibilities for establishing the period of use of the transport means. It can be provided that the existence of the period of use is detected as long as at least two of the following conditions are met: The communication link of the assistance device to the transport system exists; the load capacity of the transport means is detected; and the movement of the transport means and/or the operation of the drive device exists or exist.

Alternatively, it can be provided that the beginning of the period of use and the end of the period of use are recorded separately from each other, with the period of use extending from its beginning up to its end. For example, in this case, it can be provided that the beginning of the period of use is detected if at least two of the following conditions are met: The communication link to the transport system is created; the change in the load capacity is detected; the movement of the transport means and/or the operation of the drive device is or are being initiated.

The end of the period of use is preferably detected if at least one of the following conditions is met: The communication link is terminated; the change in the load capacity is detected; and the movement of the transport means and/or the operation of the drive device is or are suspended or being suspended. This procedural approach makes possible the reliable and transparent billing of the period of use to the user.

Another embodiment of the invention provides that a distance traversed by the transport means during the period of use is determined. The determination of the distance is made, for example, by means of a corresponding measuring unit. Alternatively, it is also possible for a determination of the distance to be made by integrating the speed of the transport means over the time it traverses the distance. Other procedural approaches may also be used for the determination of the distance. For example, the distance is used for billing the user, so that a reliable and transparent billing of the user is possible.

Another preferred embodiment of the invention provides that, from the traversed distance and/or a length of the period of use, an invoice amount is determined. The invoice amount is the monetary amount that is to be paid by the user of the transport means for the use thereof. The invoice amount can be calculated solely from the traversed distance, solely from the length of the period of use, or from both. In the latter case, the invoice amount is a function of the traversed distance and the length of the period of use. In this case, the user is invoiced only for the actual use of the transport means, thereby enabling the user to simply check the invoice amount.

In the scope of another embodiment of the invention, it is provided that the communication link between the assistance device and a central control unit of the transport system or between the assistance device and the transport means is created directly or indirectly via the central control unit. Therefore, there are fundamentally three different kinds of communication link. On the one hand, the communication link can be made between the assistance device and the central control unit. In this case, another communication link preferably is present between the central control unit and the transport means.

Alternatively, the communication link may exist directly between the assistance device and the transport means. This is understood to mean that there is no additional device and, in particular, no central control unit, in the communication link between the assistance device and the transport means. Alternatively, however, it is obviously possible to create or make the communication link between the assistance device and the transport means via the central control unit, so that in this case, the communication link exists solely indirectly.

The different communication links make possible an extremely flexible operation of the transport system. For example, it is provided that, first of all, the direct communication link is created between the assistance device and the transport means. If this is not successful, then the communication link is created between the assistance device and the central control unit. If this is successful, then, subsequently, either the additional communication link is created or the communication link is extended from the central control unit to the transport means.

To this end, it is provided that, first of all, the additional communication link is created between the central control unit and the transport means in order to ensure that the transport means can be contacted. If the creation of the additional communication link was successful, then said link can be terminated and, instead, the communication link can be extended from the central control device to the transport means, so that, ultimately, there exists the indirect communication link between the assistance device and the transport means, which runs by way of the central control unit.

An enhancement of the invention provides that, as a directly created communication link, a short-path wireless communication link is used. The short-path wireless communication link makes possible, for example, a wireless communication over a distance of at most 50 m, at most 25 m, or at most 10 m. For example, the short-path wireless communication link is created via Bluetooth or near-field communication (NFC). On account of the direct linkage of the assistance device to the transport means by communications technology, a high reliability in terms of transmitted data is achieved.

Another preferred embodiment of the invention provides that, as a communication link to the central control unit, a mobile radio-frequency link is used. The mobile radio-frequency link differs from the short-path wireless communication link, in particular, through its greater range. For example, by means of the mobile radio-frequency link, it is possible to bridge a distance of more than 100 m, at least 500 m, or at least 1000 m. The mobile radio-frequency link is created, for example, by means of GSM, UMTS, or LTE. Such links are widespread and, therefore, can be employed for the transmission of data.

Another embodiment of the invention provides that the load capacity is measured by means of a scale. In this case, the transport means is equipped with the scale, which is integrated in the transport means. By use of the scale, the current mass or the current weight of the transport means can be determined and preferably an empty mass or an empty weight is subtracted from it. From the result, the load capacity of the transport means is determined or at least the change in the load capacity is checked.

The use of the scale makes possible an especially reliable determination as to whether the user is utilizing the transport means, that is, for example, whether the user himself is present onboard the transport means. It can be provided that the load capacity that is measured by means of the scale enters, additionally or alternatively, into the invoice amount, so that, therefore, the invoice amount to be paid by the user is based on the load capacity. This makes possible an especially use-specific billing to the user.

Finally, in the scope of another embodiment of the invention, it can be provided that a destination is transmitted to the transport means by the central control unit and/or by the assistance device and the transport means drives autonomously to the destination. The transport means thus drives to the destination without any influence of an operator, in particular the user and/or the assistance device, from which the destination, for example, was transmitted. Instead, the transport means itself takes on its own route planning, which guides it from its current location to the destination.

However, the route planning can also be undertaken by the central control unit and, for example, can be transmitted to the transport means prior to the start of driving to the destination or at the beginning of driving. The transport means more preferably is equipped for a fully autonomous drive operation. In particular, the transport means is equipped with a corresponding sensor device, in particular an environment monitoring device, which preferably has the at least one environment sensor or the equivalent.

The invention further relates to a transport system, in particular for carrying out the method in accordance with the statements in the scope of this description, the system comprising at least one transport means. In this case, it is provided that the transport system is designed to record a period of use of the transport means by a user or at least a beginning of the period of use, by detecting a use of the transport means if at least two of the following conditions are met: A communication link of an assistance device of the user to the transport system exists or is being created; a load capacity of the transport means or a change in the load capacity is detected; and a movement of the transport means and/or an operation of a drive device of the transport means exists or exist or is or are being initiated.

The advantages of a procedural approach of this kind or of an embodiment of the transport system of this kind has already been addressed. Both the transport system and the method for the operation thereof can be further developed in accordance with the statements made in the scope of this description, so that in this regard, reference is made to said statements.

BRIEF DESCRIPTION OF THE DRAWINGS

The invention will be explained in detail below on the basis of the exemplary embodiments illustrated in the drawing, without resulting in any limitation of the invention thereby. In this case, the sole FIGURE shows FIG. 1 a schematic illustration of a transport means of a transport system as well as a vehicle transported by use of the transport means.

DETAILED DESCRIPTION

The FIGURE shows a schematic illustration of a transport system 1, which is equipped with at least one transport means 2 and, in the exemplary embodiment illustrated here, has two transport means 2. The transport means 2 work together in order to transport a vehicle 3. To this end, they take up the vehicle 3, so that wheels 4 of the vehicle 3 are arranged on the transport means 2. The vehicle 3 belongs to a user, who, for example, sits on a driver's seat of the vehicle 3 (not illustrated here).

In addition to the transport means 2, the transport system 1 is equipped with a central control unit 5. It is then provided that a period of use of the at least one transport means 2 or of both transport means 2 by the user is recorded. To this end, a use of the transport means or the plurality of transport means 2 is detected if at least two of the following conditions are met: A communication link between an assistance device of the user and the transport system 1, in particular to the at least one transport means 2 or the central control unit 5, exists or is being created; a load capacity of the at least one transport means 2 or a change in the load capacity is detected; and a movement of the at least one transport means 2 and/or an operation of a drive device of the at least one transport means 2 exists or exist or is or are being initiated.

Preferably, it is provided that a distance traversed during the period of use by the at least one transport means 2 is determined. This distance is subsequently used, together with the length of the period of use, for billing the use to the user. In other words, from the traversed distance and the (time) length or duration of the period of use, an invoice amount is determined and is submitted to the user as a bill. Such a procedural approach makes possible an extremely flexible and transparent billing to the user.

The invention claimed is:

1. A method for operating a transport system having at least two transports, the method comprising:
    transporting a vehicle having front wheels and rear wheels using two of the at least two transports,
    recording a period of use by a user, or at least a beginning of the period of use by the user, of the at least two transports,
    wherein a use of the at least two transports is determined upon (1) detection of a load capacity of the at least two transports or a change in the load capacity of the at least two transports, and (2) when at least one of the following conditions is met:
    a communication link of an assistance device of the user to the transport system exists or is being created; and
    a movement of the at least two transports and/or an operation of a drive device of the at least two transports exists or exist or is or are being initiated.

2. The method according to claim 1, wherein an end of the period of use is detected if at least one of the following conditions is met:
    the communication link of the assistance device of the user to the transport system is terminated or is being terminated;
    the load capacity no longer exists or a change in the load capacity is detected; and
    a movement of the at least two transports and/or an operation of a drive device of the at least two transports is or are suspended or is or are being suspended.

3. The method according to claim 1, wherein a distance traversed during the period of use by the at least two transports is determined.

4. The method according to claim 1, wherein from the traversed distance and/or a length of the period of use, an invoice amount is determined.

5. The method according to claim 1, wherein the communication link between the assistance device and a central control unit of the transport system or between the assistance device and the at least two transports is created directly or indirectly by way of the central control unit.

6. The method according to claim 1, wherein as a directly created communication link, a short-path wireless communication link is used.

7. The method according to claim 1, wherein as a communication link to a central control unit of the transport system, a mobile radio-frequency link is used.

8. The method according to claim 1, wherein the load capacity is measured by means of a scale.

9. The method according to claim 1, wherein a destination is transmitted to the at least two transports by a central control unit of the transport system and/or by the assistance device, and the at least two transports drives to the destination autonomously.

10. The method of claim 1, wherein the front wheels of the vehicle are arranged on a first transport and the rear wheels of the vehicle are arranged on a second transport.

11. A transport system, comprising:
    at least two transports,
    wherein two of the at least two transports are used to transport a vehicle having front and rear wheels,
    wherein the transport system is designed to record a period of use by a user of the at least two transports, or at least a beginning of the period of use of the at least two transports,
    wherein a use of the at least two transports is determined upon (1) detection of a load capacity of the at least two transports or a change in the load capacity of the at least two transports, and (2) when at least one of the following conditions is met:
    a communication link of an assistance device of the user to the transport system exists or is being created; and
    a movement of the at least two transports and/or an operation of a drive device of the at least two transports exists or exist or is or are being initiated.

* * * * *